(12) United States Patent
Goodman et al.

(10) Patent No.: US 11,216,621 B2
(45) Date of Patent: Jan. 4, 2022

(54) FOREIGN LANGUAGE MACHINE TRANSLATION OF DOCUMENTS IN A VARIETY OF FORMATS

(71) Applicant: Vannevar Labs, Inc., Palo Alto, CA (US)

(72) Inventors: Daniel Goodman, Mountain View, CA (US); Nathanial Hartman, Henderson, NV (US); Nathaniel Bush, Mountain View, CA (US); Brett Granberg, Palo Alto, CA (US)

(73) Assignee: Vannevar Labs, Inc., Palo Alto, CA (US)

( * ) Notice: Subject to any disclaimer, the term of this patent is extended or adjusted under 35 U.S.C. 154(b) by 0 days.

(21) Appl. No.: 17/244,884

(22) Filed: Apr. 29, 2021

(65) Prior Publication Data
US 2021/0342556 A1 Nov. 4, 2021

Related U.S. Application Data

(60) Provisional application No. 63/017,567, filed on Apr. 29, 2020.

(51) Int. Cl.
*G06F 40/58* (2020.01)
*G06F 3/0484* (2013.01)
*G06N 3/08* (2006.01)
*G06K 9/00* (2006.01)

(52) U.S. Cl.
CPC .......... *G06F 40/58* (2020.01); *G06F 3/04842* (2013.01); *G06K 9/00463* (2013.01); *G06N 3/08* (2013.01)

(58) Field of Classification Search
CPC . G06F 40/58; G06F 3/04842; G06K 9/00463; G06N 3/08
See application file for complete search history.

(56) References Cited

U.S. PATENT DOCUMENTS

| | | | |
|---|---|---|---|
| 10,599,786 B1* | 3/2020 | Malcangio | G10L 15/30 |
| 2008/0262827 A1* | 10/2008 | DeGroot | G06F 40/45 704/3 |
| 2015/0179170 A1 | 6/2015 | Sarikaya et al. | |
| 2019/0273767 A1 | 9/2019 | Nelson et al. | |
| 2019/0286706 A1* | 9/2019 | Leydon | G06F 16/3337 |
| 2019/0332680 A1 | 10/2019 | Wang et al. | |
| 2020/0042837 A1* | 2/2020 | Skinner | G06F 21/62 |
| 2020/0342968 A1* | 10/2020 | Avinash | G06N 20/00 |

OTHER PUBLICATIONS

International Search Report in PCT International Application No. PCT/US2021/030012, dated Aug. 4, 2021.

* cited by examiner

*Primary Examiner* — Kevin Ky
(74) *Attorney, Agent, or Firm* — Cognition IP, P.C.; Edward Steakley

(57) ABSTRACT

Methods, systems, and apparatus, including computer programs encoded on computer storage media, for extracting text from an input document to generate one or more inference. Each inference box may be input into a machine learning network trained on training labels. Each training label provides a human-augmented version of output from a separate machine translation engine. A first translation may be generated by machine learning network. The first translation may be displayed in a user interface with respect to display of an original version of the input document and a translated version of a portion of the input document.

19 Claims, 8 Drawing Sheets

FIG. 5

FOREIGN LANGUAGE MACHINE TRANSLATION OF DOCUMENTS IN A VARIETY OF FORMATS

CROSS-REFERENCE TO RELATED APPLICATIONS

This application claims the benefit of U.S. Provisional Application No. 63/017,567, filed Apr. 29, 2020, which is hereby incorporated by reference in its entirety.

BACKGROUND

Software based on conventional Optical Character Recognition (OCR) techniques allow for the recognition of text within input files. Traditional OCR techniques analyze the input files and translates text that appears in the input files according to character codes, such as ASCII, in order to produce a form of the text that can be manipulated by computer systems. For example, traditional OCR allows for recognizing the graphical information in an input file and translating the graphical information into a piece of editable data that can be stored and processed, whereby the editable data accurately reflects the intended meaning or value of the graphical information.

SUMMARY

Some of the disclosure herein relates to a method, computer-program product and a system for extracting text from an input document to generate one or more inference boxes. Each inference box may be input into a machine learning network trained on training labels. Each training label provides a human-augmented version of output from a separate machine translation engine. A first translation may be generated by machine learning network. The first translation may be displayed in a user interface with respect to display of an original version of the input document and a translated version of a portion of the input document.

Various conventional machine translation systems may provide reliable and standard translation for input text. However, translations generated by conventional machine translation systems may fail to properly account for certain linguistic variations and dialects present in a specific corpus of input documents in multiple formats used for different types of communication channels. In such a context, a standard translation is less valuable because a standard translation inevitably strips the input document of its true meaning since the linguistic variations and dialects cannot be properly handled by conventional translation processing.

According to various embodiments, a plurality of foreign language text strings may exist in different formats within a specifically curated corpus of documents. For example, the specifically curated corpus of documents may relate to communications sent and received within a community of persons and/or organizations. Since the community of persons is the source of the document corpus, the document corpus may include an unusually high occurrence (or novel occurrences) of distinct linguistic variations, dialects, slang terms, abbreviations, typographical elements and unique phrases created by and/or utilized by that pre-defined community. As such, since conventional third-party, open source machine translation engines are not trained on those linguistic variations and dialects, the conventional machine translation engines will fail to properly translate of the text strings in the specialized document corpus.

Various embodiments herein are directed to deploying a machine learning network trained on training data based on conventional translations that have been augmented by human labelers with specialized knowledge of the pre-defined community of persons and/or organizations. The human-augmented translations are defined as training labels used for training the machine learning network.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 5 illustrates an exemplary user interface that may be used in some embodiments.

DETAILED DESCRIPTION

Figure 1:
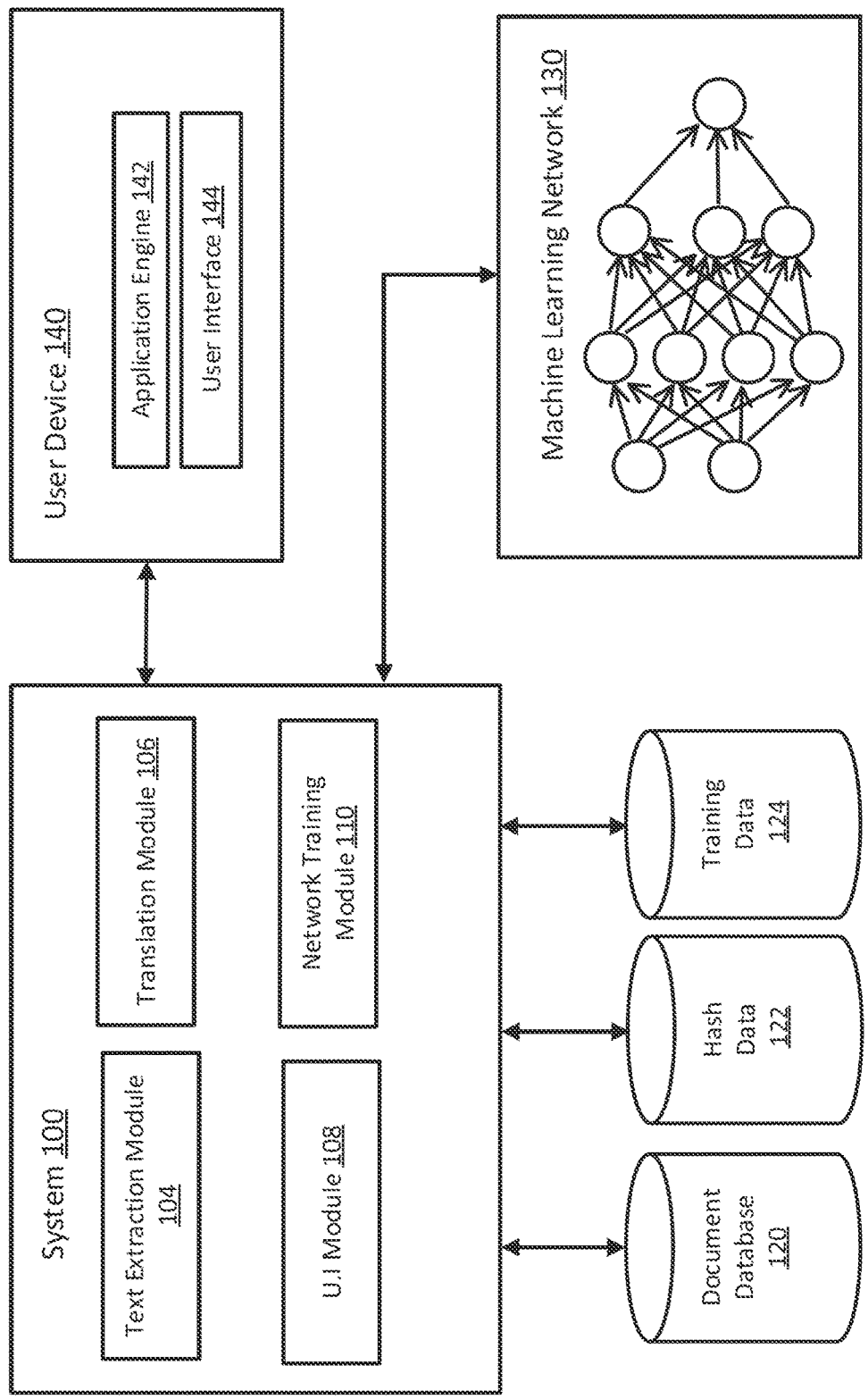
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 is a diagram illustrating an exemplary environment in which some embodiments may operate. FIG. 1 illustrates a block diagram of an example system 100 of the system for training a machine learning network 130 with input training data database(s) 124 that may include training labels as well as output translations generated by the system 100. The system 100 includes a text extraction module 104, a translation module 106, a U.I. module 108, a user and a network training module 110. The system 100 may communicate with a user device 140 to display output, via a user interface 144 generated by an application engine 142. The machine learning network 130 and the databases 120, 122, 124 may further be components of the system 100 as well.

Figure 2A:
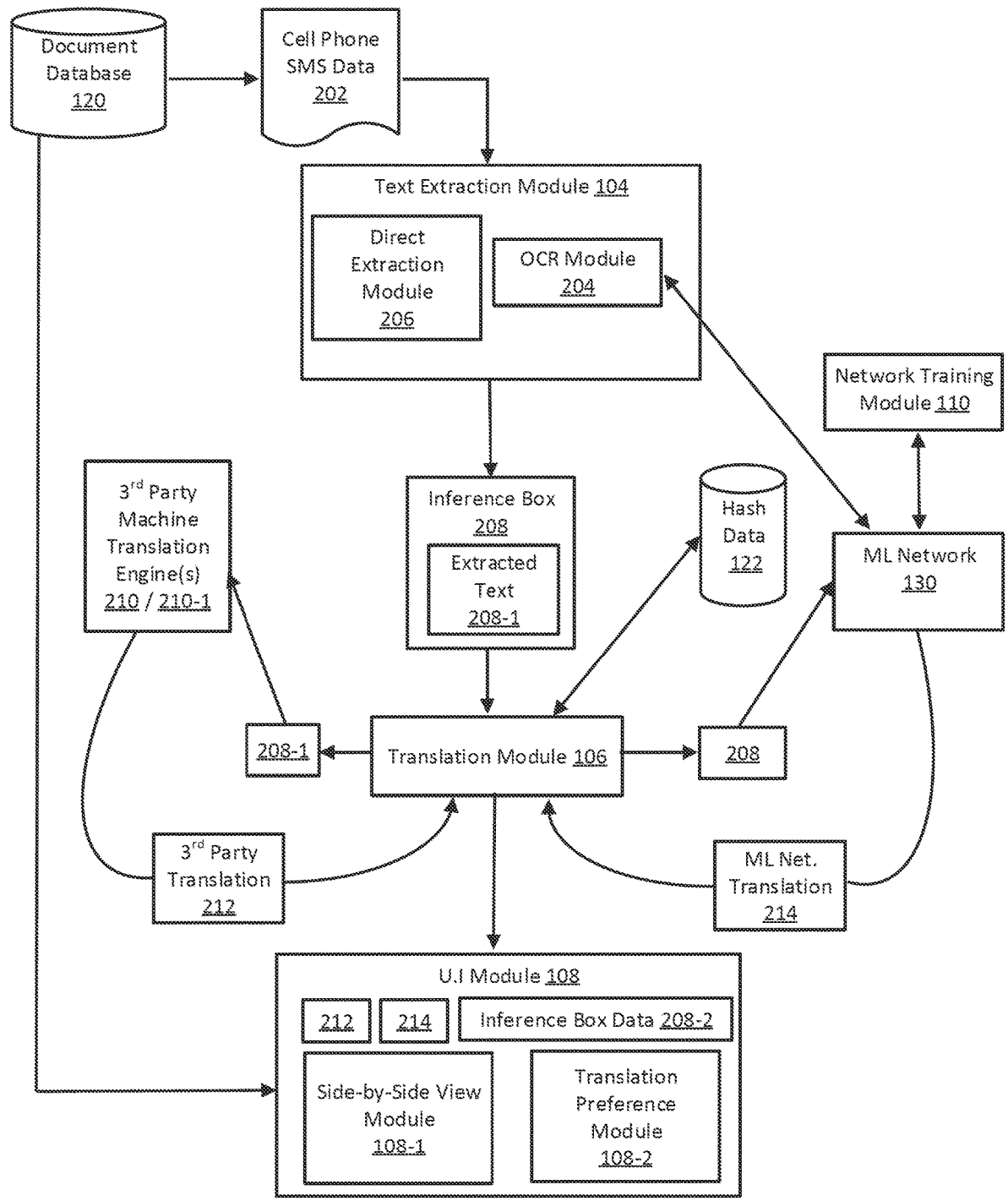
FIG. 2A is a diagram illustrating an exemplary environment in which some embodiments may operate.
Figure 3A:
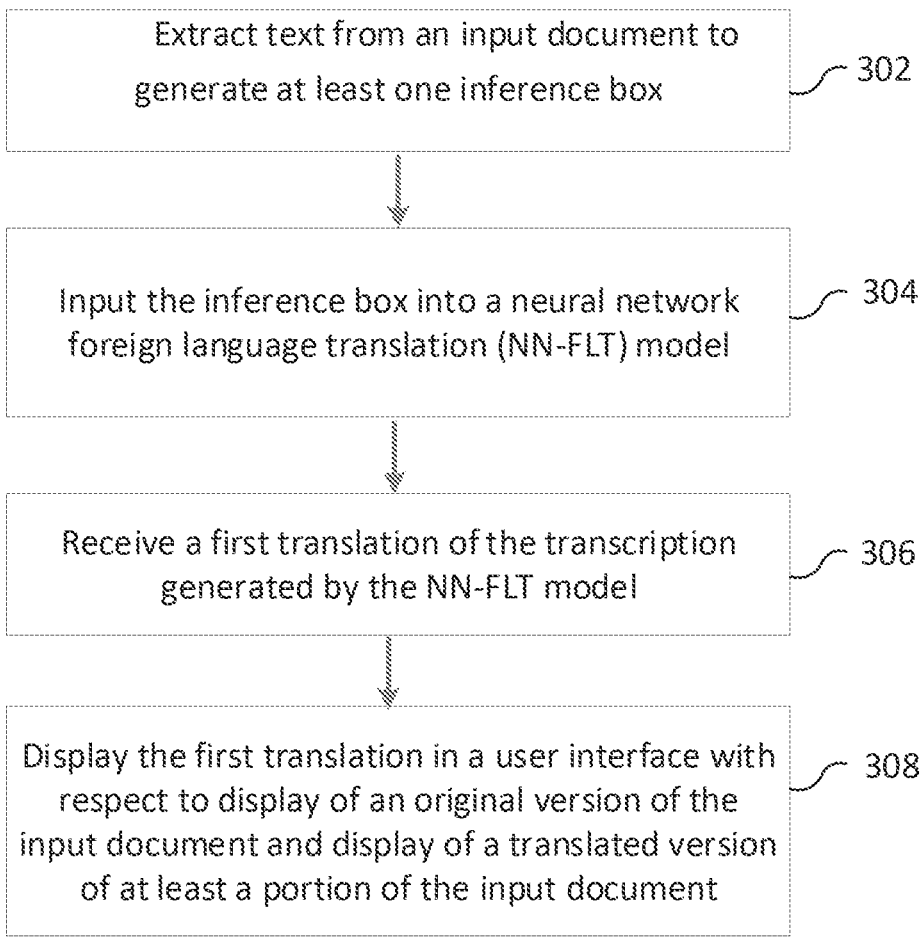
FIG. 3A is a flow chart illustrating an exemplary method that may be performed in some embodiments.
Figure 3B:
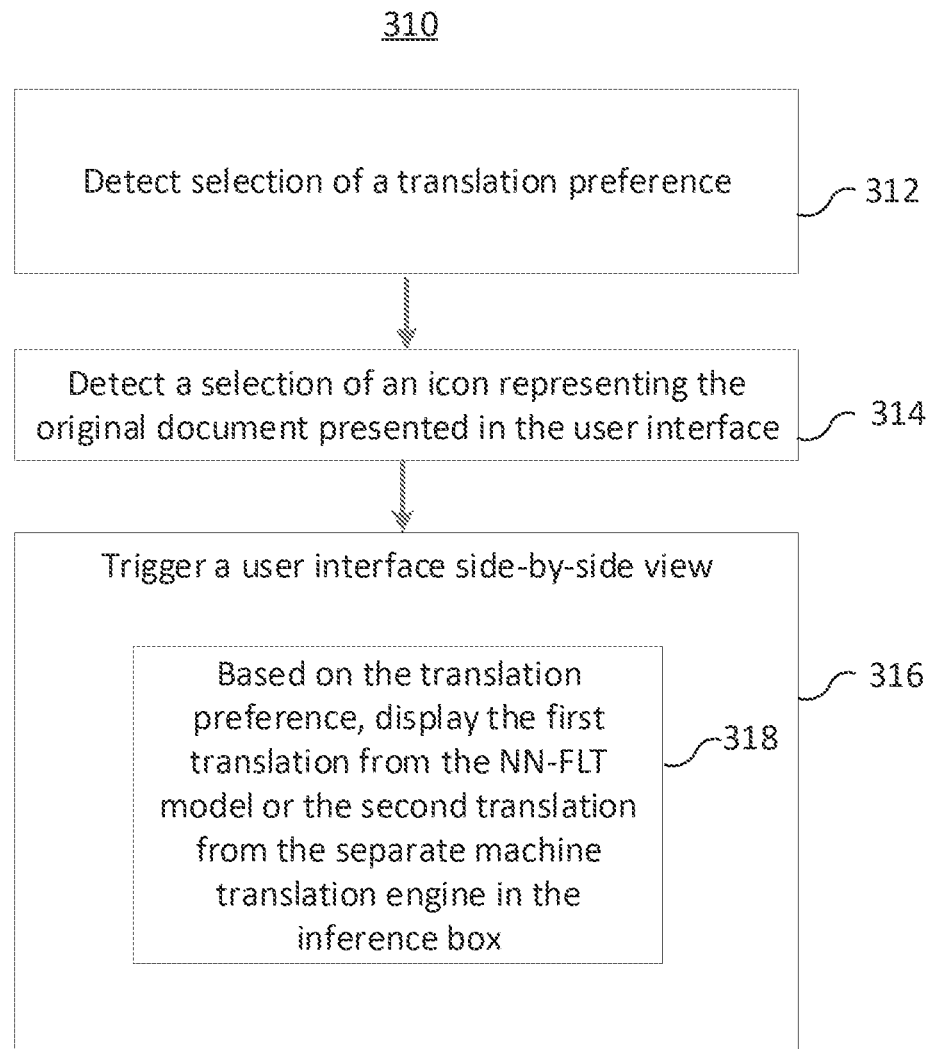
FIG. 3B is a flow chart illustrating an exemplary method that may be performed in some embodiments.

The text extraction module 104 of the system 100 may perform functionality as illustrated in FIGS. 2A, 3A and 3B.

The translation module 106 of the system 100 may perform functionality as illustrated in FIGS. 2A, 3A and 3B.

The user interface module 108 of the system 100 may perform functionality as illustrated in FIGS. 2A, 3A, 3B, 4 and 5.

Figure 2B:
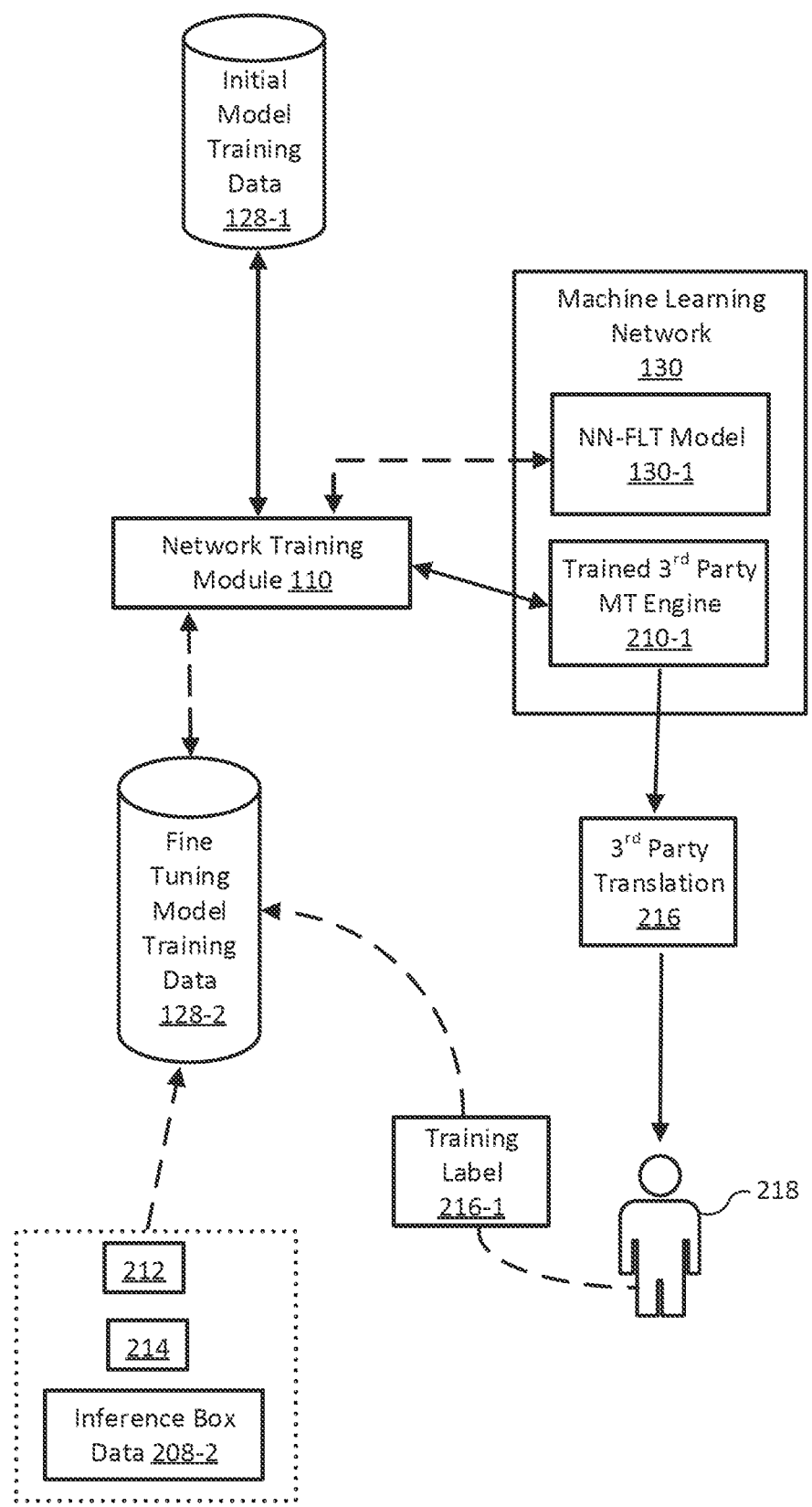
FIG. 2B is a diagram illustrating an exemplary environment in which some embodiments may operate.

The network training module 110 of the system 100 may perform functionality as illustrated in FIG. 2B in order to train the machine learning network 130 based on data in the one or more databases 120, 122, 124.

While the databases 120, 122 and 124 are displayed separately, the databases and information maintained in a database may be combined together or further separated in a manner the promotes retrieval and storage efficiency and/or data security.

Embodiments may be used on a wide variety of computing devices in accordance with the definition of computer and computer system earlier in this patent. Mobile devices such as cellular phones, smart phones, PDAs, and tablets may implement the functionality described in this patent.

As shown in FIG. 2A, a cell phone SMS data document 202 may be fetched from a document database 120 for translation. The system 100 may input the document 202 into the text extraction module 104. The text extraction module 104 performs optical character recognition (OCR) on the document 202 via an OCR module 204 or direct text extraction from the document 202 via a direct extraction module 206. The text extraction module 104 generates an inference box 208 which includes a transcription of text extracted from the document 202. In some embodiments, the inference box 208 may further include one or more coordinates that map to a location in the document 202 of the extracted text and a transcription probability that represents a probability that the transcription in the inference box 208 accurately represents the corresponding text extracted from the document. It is understood that both the OCR module 204 and the direct text extraction module 206 generate transcription probabilities.

In some embodiments, the OCR module 204 may determine one or more image blob from an input document image. The OCR module 204 may identify a convex hull for each image blob. Each convex hull may be replaced with a bounding box to generate a set of bounding boxes. Intersecting bounding boxes may be incorporated into a merged bounding box indicative of image data portions that likely portray one or more words from the input document image. Each merged bounding box may be fed into a convolutional neural network (CNN) portion of the machine learning network 130 to identify one or more words of the source image represented in the respective merged bounding box.

An input for a CNN may be based on a merged bounding box. The CNN generates a plurality of inference box-slice vectors based on the image data of the merged bounding box. The inference box-slice vectors are fed into a Bi-Directional Long-Short Term Memory model (LSTM) which generates contextually aware modified inference vectors based on receptive field data. The modified inference vectors may each be re-sized and input into a Connectionist Temporal Classification (CTC) model. The CTC model may output one or more identified words portrayed in the input document image and a confidence score which represents a translation probability of the identified words. The translation probability represents a confidence score of how likely the identified words are correct. The translation probability and the one or more identified words may be assigned an inference box for transmission to the translation module 106.

The text extraction module 104 sends the inference box 208 to the translation module 106. The translation module 106 may take a hash of one or more portions of the extracted text 208-1 and compare the hash to previous hashes stored in a hash database 122. If the calculated hash is already present in the hash database 122, then the extracted text 208-1 has already been translated and further processing of the extracted text 208-1 is not required. If the calculated hash is not present in the hash database 122, the translation module 106 inserts the calculated hash is in the hash database 122 and proceeds to translate the extracted text 208-1.

The translation module 106 sends the inference box 208 to the machine learning network 130. The machine learning network 130 provides a translation 214 to the translation module. In some embodiments, the translation module 106 may also send the extracted text 208-1 to a 3rd-party machine translation engine 210 that is separate from the system 100. The 3rd party machine translation engine 210 may also provide a 3rd-party translation 212 to the translation module. The translation module 106 may send the 3rd-party translation 212, the machine learning network translation 214 and inference box data 208-2 to the U.I. module 108. The U.I. module may have access to the document 202 and a translated version of a portion of the document that may be displayed in the user interface 144 in a side-by-side view generated by a side-by-side view module 108-2. While the user interface is displayed, a translation preference module 108-2 may allow toggling between display of the 3rd-party translation 212 and the machine learning network translation 214.

As shown in FIG. 2B, the network training module 110 may train a neural network foreign language translation (NN-FLT) model 130-1 in the machine learning network 130. In some embodiments, the network training module 110 may train the NN-FLT model 130-1 for translation to a particular foreign language or multiple foreign languages. The network training module 110 may initially access bulk training data 128-1 for an initial training phase. The network training module 110 sends the initial training data 128-1 to a 3rd-party machine translation engine loaded in the machine learning network in order to generate a trained 3rd-party machine translation engine 210-1. The trained 3rd-party machine translation engine 210-1 may generate one or more 3rd-Party training translations 216 based on input data. According to some embodiments, one or more human labelers 218 take as input a spreadsheet(s) that has extracted inference boxes of text for each 3rd-Party training translation 216. In some embodiments, the labelers 218 receive an inference box that contains each original transcription that corresponds with each translation 216. Each inference box placed in a spreadsheet next to the corresponding translation 216. The labelers 218 correct and/or modify the provided translation 216 rather than writing a new translation. Augmenting the provided translation 216 according to the linguistic judgment of the human labelers 218 increases data labeling speed without degrading the quality of training data. The human-augmented version of the translation 216 is defined as a training label 216-1. The training label 216-1 is stored as training data in a training data database 128-2 and input into the machine learning network 130 to train NN-FLT model 130-1 to make translations of one or more portions of text that account for the specialized linguistic knowledge of the human labelers 218. In some embodiments, as the system 100 is deployed to provide actual translations, output 212, 214, 208-2 for such actual translations generated by the NN-FLT model 130-1 may be looped back into the training data 128-2 and further be used by the network training module 110 for further training of the NN-FLT model 130-1. According to various embodiments, the NN-FLT model 130-1 can be further trained to detect translation accuracy and provide the system 100 with data indicating a translation that should be prioritized for display to an end-user.

As shown in flowchart 300 of FIG. 3A, the system 100 extracts text from an input document(s) 202 to generate an inference box(s) 208 (Act 302). For example, the document database 120 may include documents sourced from a predefined community of persons and/or organizations. Such documents may include multiple foreign language text types, cellular phone data dumps, audio and video transcriptions (e.g. audio-to-text), spreadsheets, html documents and text documents (.doc, .txt, .rtf). The system 100 can upload a single document 202 or collection of documents for translation. In some embodiments, a collection of documents may consist of folder and/or disk images in E01 format. When the system 100 uploads a collection of documents, the system 100 imports one or more documents in the collection and preserves respective document positions according to a corresponding file system/disk. In various embodiments, the document database 120 may include image documents, text documents and/or documents that include both image and text data. In various embodiments, the document database 120 may include documents of any kind of format such as, for example, .png, .pdf, .docx, .pptx, .csv, .xlsx, and/or rtf. In some embodiments, the document database 120 may include the movie/audio files that are initially converted by the system from speech-to-text to generate a transcript, which is then used a transcript document to be translated.

An inference box 208 may include one or more strings of text extracted from a location within an input document 202. The inference box 208 may include inference box data 208-2 representing an input document location defined according to one or more rectangular coordinates that map from the input document location to the inference box 208. Inference box data 208-2 may include one or more translation probabilities generated by the text extraction module 104 and the machine learning network 130. The extracted text stored in association with a corresponding inference box may be defined as a transcription. It is understood that multiple portions of text may be extracted from a document 202 such that the system 100 generates multiple inference boxes for each respective portions of extract text in order to generate a translated version of the entire document 202 such that the U.I module 108 may display one or more portions of the translated version of the entire document 202 or display the translated version of the entire document 202 in is entirety.

The system 100 inputs the inference box(s) 208 into a neural network foreign language translation (NN-FLT) model 130-1 trained on one or more training labels associated with a separate machine translation engine (Act 304). For example, the machine learning network 130 may be a neural network foreign language translation model based on an encoder-decoder transformer translation network architecture. Each training label 216-1 provides a human-augmented version of each portion of machine translation output 216 received from the separate machine translation engine 210.

The system 100 receives a first translation of the transcription generated by the NN-FLT model 130-1 and a first translation probability for the extracted text calculated by the NN-FLT model 130-1 (Act 306). In some embodiments, the NN-FLT model 130-1 may generate one or more translation probabilities for each text string in a transcription as the NN-FLT model 130-1 parses through the transcription. For example, the NN-FLT model 130-1 generates a first translation probability upon translating a first text string of a transcription provided in a respective inference box. The first translation probability is then input back into the NN-FLT model 130-1 for generation of a second translation probability of a second text string in the same transcription. Again, the second translation probability is also input back into the NN-FLT model 130-1 for generation of a third translation probability of a third text string in the same transcription. It is understood that translation probabilities will be refed back into the NN-FLT model 130-1 for translation of subsequent text strings of the same transcription until all text strings have been translated. In some embodiments, one or more translation probabilities generated by the NN-FLT model 130-1 may be included in the inference box data 208-2. According to various embodiments, it is understood that an inference box generated by the text extraction module 104 may include multiple transcriptions for the same particular portion of text extracted from a document. Each transcription in the inference box may thereby have its own transcription probability. The NN-FLT model 130-1 generates a respective translation of each different transcription in the inference box, whereby each respective translation may implicate the NN-FLT model 130-1 use of multiple translation probabilities for subsequent text strings during translation of each different transcription. Upon completion of translation of the different transcriptions, a final translation probability is calculated for each different transcription as a product of its transcription probability (from the text extraction module 104) and the various translation probabilities calculated by the NN-FLT model 130-1 during translation. In some embodiments, the translation with a highest final translation probability is selected by the system 100 as a translation that is likely to be the most accurate.

The system 100 displays the first translation in a user interface with respect to display of an original version of the input document and display of a translated version a portion(s) of the input document (Act 308). For example, the system 100 triggers generation of a user interface 144 that may provide a concurrent view of the original version of the document 202 and a translated version of the document 202. In some embodiments, the original and translated versions of the document 202 may be displayed according to a side-by-side view in which the input document location of an inference box 208 is indicated in both renderings of the original and translated versions of the document 202. In some embodiments, the system 100 provides a functionality that triggers toggling between a display of a 3rd-party translation 212 and the system's translation 214 within a representation of an inference box displayed in the side-by-side view.

As shown in flowchart 310 of FIG. 3B, the system 100 detects selection of a translation preference (Act 312). For example, the U.I. module 108 may provide a selectable functionality menu from which a translation preference may be selected. The translation preference may indicate a choice between the 3rd-party translation 212 and the system's translation 214 during a display session of the user interface 144.

The system 100 detects a selection of an icon representing the original document presented in the user interface (Act 314). The user interface 144 may display a plurality of selectable document icons whereby each respective document icon represents a document from the document database 120 that has been translated. For example, an end user of the system 100 may provide input to the system indicating selection of a document icon associated with a cell phone SMS data document 202.

The system 100 triggers display of a user interface side-by-side view of a portion of the original version of the input document and the translated version of the portion of the input document (Act 318). For example, the side-by-side view may be displayed in the user interface 144 in response to selection of a document icon. An instance of the inference box is represented in the displayed original version of the input document and the displayed translated version of the input document. Each displayed inference box instance may display a preferred translation of the transcription. In various embodiments, rendering of both instances of the inference boxes includes dynamic resizing of the inference box instances based one or more dimensions of the side-by-side view. Dynamic resizing results in both inference box instances being displayed in similar sizes at approximately similar displayed document locations in the side-by-side view.

In various embodiments, an inference box displayed in the side-by-side view may be displayed according a pre-define color, where the pre-defined color that represents a probability that the corresponding displayed translation is an accurate translation. When a translation preference is selected from a menu, a translation probability range may also be selected. In response to selection of the translation probability range, the system displays inference box instances in the side-by-side view that have a translation probability that falls within the translation probability range.

It is understood that some of the acts of the exemplary methods illustrated in the flowcharts 300, 310 may be performed in different orders or in parallel. Also, the acts of the exemplary methods may occur in two or more computers in a networked environment. Various acts may be optional. Some acts may occur on a local computer with other acts occurring on a remote computer.

Figure 4:
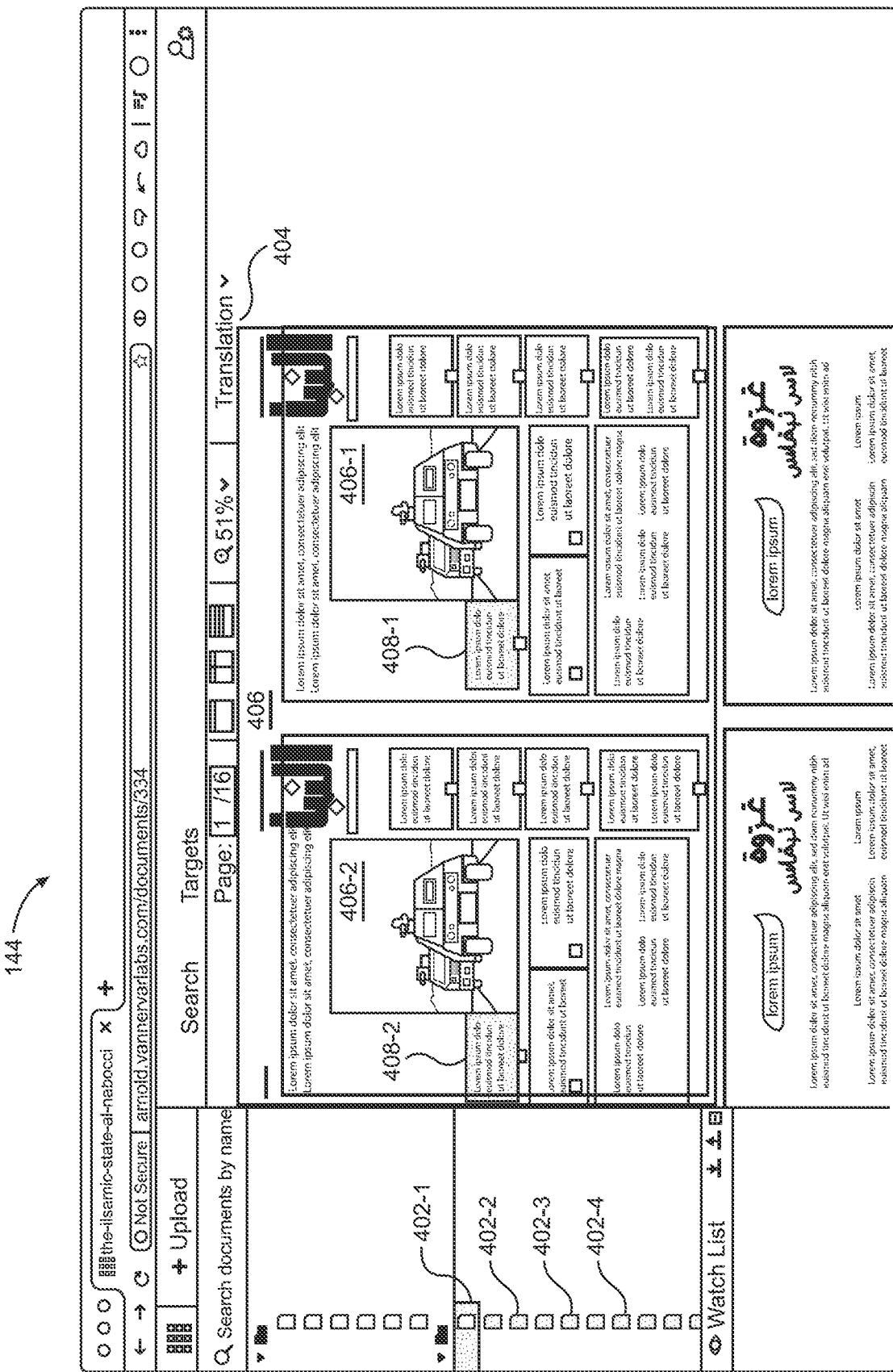
FIG. 4 illustrates an exemplary user interface that may be used in some embodiments.

As shown in FIG. 4, the user interface 144 includes a plurality of document icons 402-1, 402-2, 402-3, 402-2. Each document icon represents a document in a document collection stored in the document database 120. For example, icon 402-1 may represent a webpage document stored in the document database 120. Upon selection of the icon 402-1, the system 100 triggers display of a side-by-side view 406 in the user interface 144. The side-by-side view 406 includes display of a translated version of the document 406-1 and display of an original version of the document 406-2. Each displayed version 406-1, 406-2 includes display of an inference box instance 408-1, 408-2. Both inference box instances 408-1, 408-2 are correspond to an inference box generated by the text extraction module 104 which includes a specific transcription of text extracted from the webpage document. Both inference box instances 408-1, 408-2 are displayed with respect to an input document location of the extracted text. A first inference box instance 408-1 in the translated version of the document 406-1 may displays various types of translations. For example, an end-user may access a menu 404 and select a translation preference indicating which type of translation should be displayed in the first inference box instance 408-1. For example, the end-user may select a translation preference for display of a 3rd-party translation or a machine learning network translation.

In some embodiments, the end-user may toggle between translation preferences. Such toggling provides the end-user with a view of the standardized 3rd-party translation from the 3rd-party machine translation engine which does not account for linguistic variations and dialects. However, when the end-user selects a translation preference for the machine learning network translation, then display of the 3rd-party translation in the first inference box instance 408-1 is replaced with a display of the machine learning network translation. Display of the machine learning network translation provides the end-user with a view of a translation generated by the machine learning network 130 that accounts for linguistic variations and dialects because the machine learning network was trained on training labels which included human-augmented data based on the linguistic variations and dialects. In various embodiments, the system 100 may provide the end-user with a selectable functionality to toggle between translations according to selected dialect preference. For example, a menu rendered in the user interface 144 may display one or more dialects from which the end-user may select. Upon receiving a selection of a dialect preference, the system 100 provides the user interface 144 with one or more translations in the select dialect.

Figure 5:
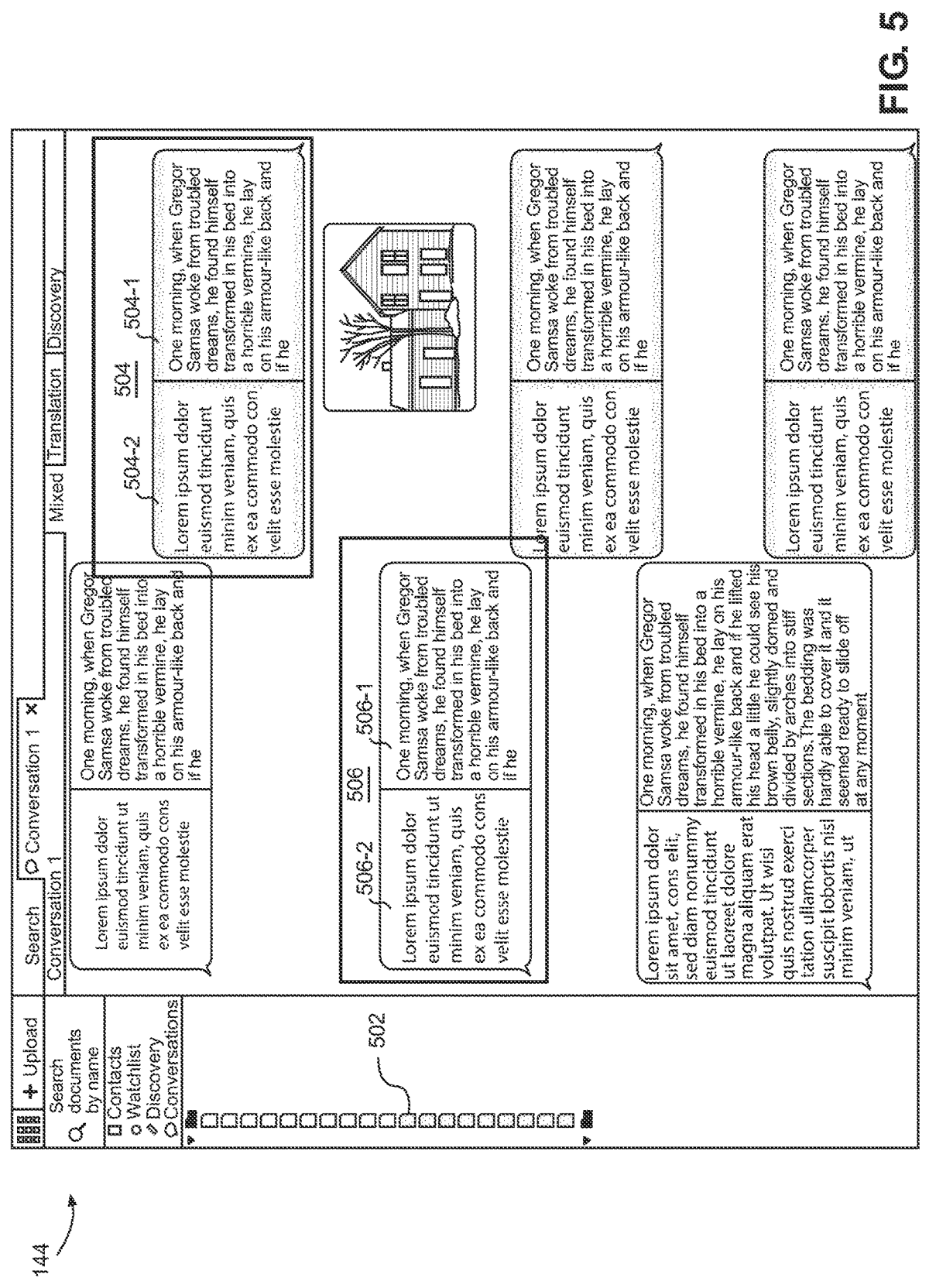

As shown in FIG. 5, the user interface 144 includes a plurality of document icons. Each document icon represents a document in a document collection stored in the document database 120. Each document may include SMS data from cellphone transmissions in a cellphone document corpus. For example, icon 502 may represent a cellphone document 202 that includes SMS data. Upon selection of the icon 502, the system 100 triggers display of multiple side-by-side views 504, 506 in the user interface 144. Each side-by-side view 504, 506 includes display of a translated version of SMS data 504-1, 506-1 and display of the corresponding original SMS messages 504-2, 506-2. The original SMS messages 504-2, 506-2 may also be stored in the document database 120. According to various embodiments, each translated SMS message 504-1, 506-1 may be based on multiple inference box instances that include strings extracted from the original SMS messages 504-2, 506-2. For example, the extracted text 208-1 of the inference box 208 may one or more strings that are part of the SMS message 504-2. In other embodiments, the extracted text 208-1 in the inference box 208 may be all the strings in the SMS message 504-2. According to various embodiments, a plurality of SMS message may each have a timestamp that falls within a time span (e.g. within 1 hour, within 15 minute). The plurality of messages are defined as a document for the purposes of translation such that all the text from the strings from the plurality of the messages are included within a transcription in an inference box. The translation of the transcription may thereby by displayed in a manner similar to display of the translated version of SMS data 504-1, 506-1.

The input document location for each translated SMS message 504-1, 506-1 is based on when the SMS message 504-1, 506-1 was sent and/or received. For example, the first side-by-side view 504 is displayed above the second side-by-side view 506 because the first SMS message 504-2 was sent and/or received before the second SMS message 506-2. In addition, an end-user may toggle between translation preferences in order to switch between different types of translations in each side-by side view 504, 506. For example, a standardized 3rd-party translation may be the displayed translation 504-1 of the first SMS message 504-2. However, when the end-user selects a translation preference for the machine learning network translation, the displayed translation 504-1 in the side-by-side view 504 is based on a machine learning network translation. Display of the machine learning network translation provides the end-user with a view of a translation generated by the machine learning network 130 that accounts for linguistic variations and dialects because the machine learning network was trained on training labels which included human-augmented data based on the linguistic variations and dialects.

According to various embodiments, the system 100 may perform a binary search across a range of display font sizes to determine an optimal font size for display of the original versions of text and translated versions of text. For example, the range of display font sizes may be defined by a minimum and a maximum font size and the binary search with be executed between the minimum and maximum font sizes with respect to display dimensions of the user interface 144 to identify an optimal font size.

According to various embodiments, the user interface 144 includes a search functionality for receiving search query input from an end-user. In response to the search query input, the system 100 may perform a search against both an original version of text and one or more translations of transcriptions of the original text.

It is understood that machine learning network 130 may include, and is not limited to, a modeling according to neural net based algorithm, such as Artificial Neural Network, Deep Learning; a robust linear regression algorithm, such as Random Sample Consensus, Huber Regression, or Theil-Sen Estimator; a tree-based algorithm, such as Classification and Regression Tree, Random Forest, Extra Tree, Gradient Boost Machine, or Alternating Model Tree; Naïve Bayes Classifier; and other suitable machine learning algorithms.

Figure 6:
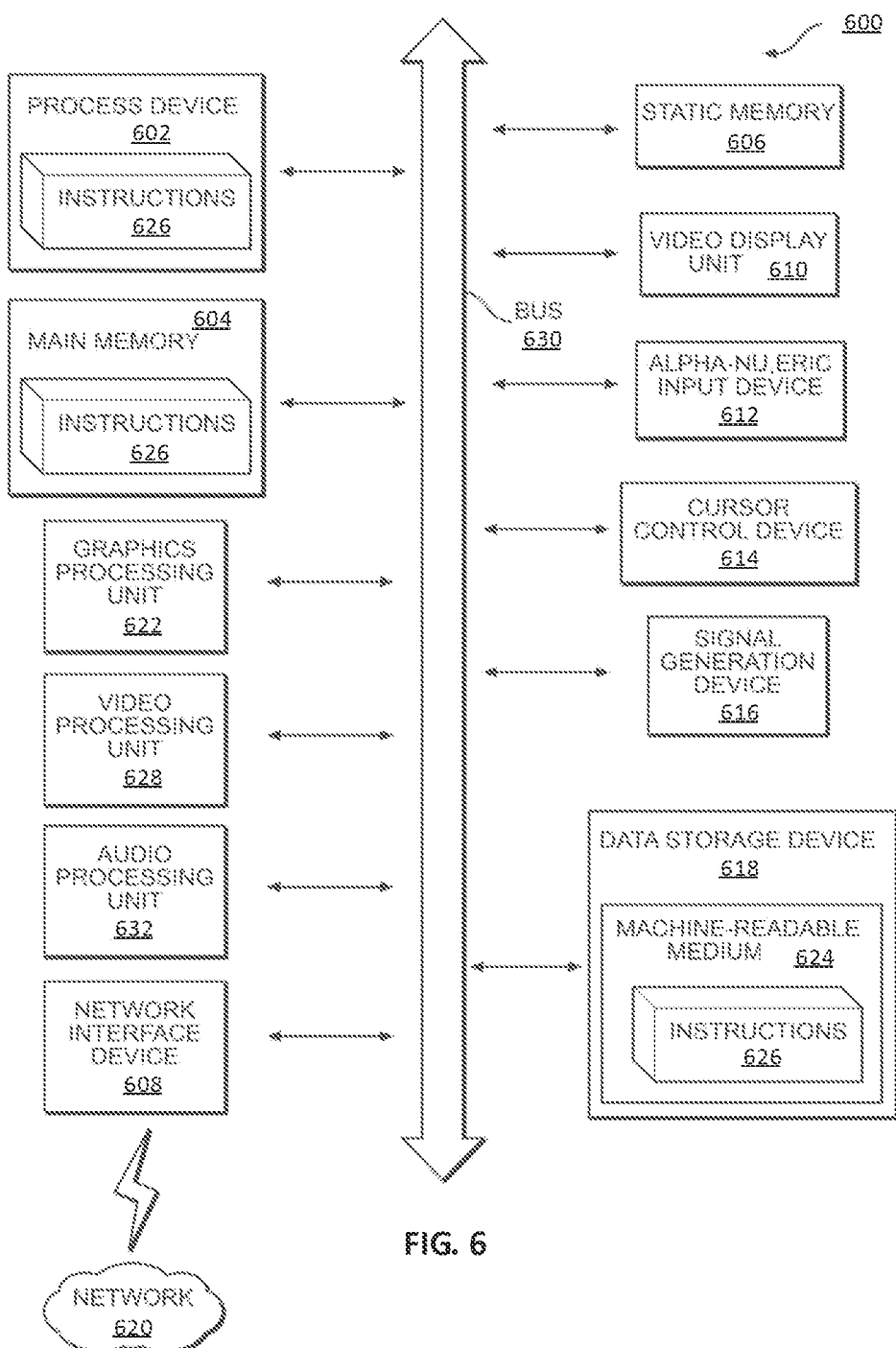
FIG. 6 illustrates an example machine of a computer system in which some embodiments may operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) or an input touch device, a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality corresponding to the components of a device to perform the disclosure herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Embodiments may further include a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

Embodiments may include a machine-readable storage medium (also known as a computer-readable medium) on which is stored one or more sets of instructions or software embodying any one or more of the methodologies or functions described herein. The term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system comprising:
    one or more processors; and
    a non-transitory computer readable medium storing a plurality of instructions, which when executed, cause the one or more processors to:
    extract text from an input document to generate at least one inference box based on the extracted text, the inference box including a transcription of the extracted text;
    input the inference box into a neural network foreign language translation (NN-FLT) model trained on one or more training labels associated with a separate machine translation engine, each training label providing a human-augmented version of each portion of machine translation output received from the separate machine translation engine, further comprising:
    calculate a hash of the extracted text;
    if the hash is located in a hash index of previously translated text:
      (i) skip input of the inference box to avoid retranslation; and
    if the hash is not located in the hash index:
      (i) add the hash to the hash index; and
      (ii) proceed to input the inference box into the NN-FLT model;
    receive a first translation of the transcription generated by the NN-FLT model; and
    display the first translation in a user interface with respect to display of an original version of the input document and display of a translated version of at least a portion of the input document.

2. The system of claim 1, wherein extract text from an input document comprises:
    extract a plurality of foreign language text strings from a cell phone document corpus, wherein at least one of the foreign language text strings is based on one or more foreign language linguistic variations utilized by a community of persons that is a source of the cell phone document corpus; wherein the separate machine translation engine comprises a third-party, open source machine translation engine unfamiliar with the one or more foreign language linguistic variations; and
    generate a respective inference box for each extracted foreign language text strings.

3. The system of claim 1, wherein the NN-FLT model is a transformer translation network based on an encoder-decoder transformer architecture.

4. The system of claim 1, wherein extract text from an input document for generation at least one inference box comprises:
receive a transcription probability resulting from one of: optical character recognition or direct text extraction, wherein the inference box includes the transcription, the transcription probability and one or more coordinates that map to an input document location of the extracted text.

5. The system of claim 1, further comprises:
send the transcription of the extracted text to the separate machine translation engine;
receive a second translation of the transcription generated by separate machine translation engine; and
wherein display the first translation in the user interface comprises:
display the first and the second translation of the transcription with respect to display of the original version of the input document and display of the translated version of at least a portion of the input document.

6. A system comprising:
one or more processors; and
a non-transitory computer readable medium storing a plurality of instructions, which when executed, cause the one or more processors to:
extract text from an input document to generate at least one inference box based on the extracted text, the inference box including a transcription of the extracted text;
input the inference box into a neural network foreign language translation (NN-FLT) model trained on one or more training labels associated with a separate machine translation engine, each training label providing a human-augmented version of each portion of machine translation output received from the separate machine translation engine;
receive a first translation of the transcription generated by the NN-FLT model; and
display the first translation in a user interface with respect to display of an original version of the input document and display of a translated version of at least a portion of the input document, wherein display the first translation in the user interface further comprises:
detect a selection of an icon representing the original document presented in the user interface; and
based on the selection of the icon, triggering a user interface side-by-side view of a portion of the original version of the input document and the translated version of the portion of the input document, wherein the inference box is represented in both views of the portion of the original version of the input document and the translated version of the portion of the input document.

7. The system of claim 6, wherein triggering the user interface side-by-side view comprises:
detect selection of a translation preference; and
based on the translation preference, display the first translation from the NN-FLT model or the second translation from the separate machine translation engine in the inference box represented in the translated version of the portion of the input document.

8. A computer-implemented method, comprising:
extracting text from an input document to generate at least one inference box based on the extracted text, the inference box including a transcription of the extracted text;
inputting the inference box into a neural network foreign language translation (NN-FLT) model trained on one or more training labels associated with a separate machine translation engine, each training label providing a human-augmented version of each portion of machine translation output received from the separate machine translation engine, further comprising:
calculating a hash of the extracted text;
if the hash is located in a hash index of previously translated text:
(i) skipping input of the inference box to avoid retranslation; and
if the hash is not located in the hash index:
(i) adding the hash to the hash index; and
(ii) proceeding to input the inference box into the NN-FLT model;
receiving a first translation of the transcription generated by the NN-FLT model; and
displaying the first translation in a user interface with respect to display of an original version of the input document and display of a translated version of at least a portion of the input document.

9. The computer-implemented method of claim 8, wherein extracting text from an input document comprises:
extracting a plurality of foreign language text strings from a cell phone document corpus, wherein at least one of the foreign language text strings is based on one or more foreign language linguistic variations utilized by a community of persons that is a source of the cell phone document corpus; wherein the separate machine translation engine comprises a third-party, open source machine translation engine unfamiliar with the one or more foreign language linguistic variations; and
generating a respective inference box for each extracted foreign language text strings.

10. The computer-implemented method of claim 8, wherein the NN-FLT model is a transformer translation network based on an encoder-decoder transformer architecture.

11. The computer-implemented method of claim 8, wherein extract text from an input document for generation at least one inference box comprises:
receiving a transcription probability resulting from one of: optical character recognition or direct text extraction, wherein the inference box includes the transcription, the transcription probability and one or more coordinates that map to an input document location of the extracted text.

12. The computer-implemented method of claim 8, further comprises:
sending the transcription of the extracted text to the separate machine translation engine;
receiving a second translation of the transcription generated by separate machine translation engine; and
wherein displaying the first translation in the user interface comprises:
displaying the first and the second translation of the transcription with respect to display of the original version of the input document and display of the translated version of at least a portion of the input document.

13. A computer-implemented method, comprising:
- extracting text from an input document to generate at least one inference box based on the extracted text, the inference box including a transcription of the extracted text;
- inputting the inference box into a neural network foreign language translation (NN-FLT) model trained on one or more training labels associated with a separate machine translation engine, each training label providing a human-augmented version of each portion of machine translation output received from the separate machine translation engine;
- receiving a first translation of the transcription generated by the NN-FLT model; and
- displaying the first translation in a user interface with respect to display of an original version of the input document and display of a translated version of at least a portion of the input document, wherein displaying the first translation in the user interface further comprises:
  - detecting a selection of an icon representing the original document presented in the user interface; and
  - based on the selection of the icon, triggering a user interface side-by-side view of a portion of the original version of the input document and the translated version of the portion of the input document, wherein the inference box is represented in both views of the portion of the original version of the input document and the translated version of the portion of the input document.

14. The computer-implemented method of claim 13, wherein triggering the user interface side-by-side view comprises:
- detecting selection of a translation preference; and
- based on the translation preference, displaying the first translation from the NN-FLT model or the second translation from the separate machine translation engine in the inference box represented in the translated version of the portion of the input document.

15. A computer program product comprising a non-transitory computer-readable medium having a computer-readable program code embodied therein to be executed by one or more processors, the program code including instructions to:
- extract text from an input document to generate at least one inference box based on the extracted text, the inference box including a transcription of the extracted text;
- input the inference box into a neural network foreign language translation (NN-FLT) model trained on one or more training labels associated with a separate machine translation engine, each training label providing a human-augmented version of each portion of machine translation output received from the separate machine translation engine, further comprising:
  - calculate a hash of the extracted text;
  - if the hash is located in a hash index of previously translated text:
    - (i) skip input of the inference box to avoid retranslation; and
  - if the hash is not located in the hash index:
    - (i) add the hash to the hash index; and
    - (ii) proceed to input the inference box into the NN-FLT model;
- receive a first translation of the transcription generated by the NN-FLT model; and
- display the first translation in a user interface with respect to display of an original version of the input document and display of a translated version of at least a portion of the input document.

16. The computer program product of claim 15, wherein extract text from an input document comprises:
- extract a plurality of foreign language text strings from a cell phone document corpus, wherein at least one of the foreign language text strings is based on one or more foreign language linguistic variations utilized by a community of persons that is a source of the cell phone document corpus; wherein the separate machine translation engine comprises a third-party, open source machine translation engine unfamiliar with the one or more foreign language linguistic variations; and
- generate a respective inference box for each extracted foreign language text strings.

17. The computer program product of claim 15, wherein the NN-FLT model is a transformer translation network based on an encoder-decoder transformer architecture.

18. The computer program product of claim 15, further comprises:
- send the transcription of the extracted text to the separate machine translation engine;
- receive a second translation of the transcription generated by separate machine translation engine; and
- wherein display the first translation in the user interface comprises:
  - display the first and the second translation of the transcription with respect to display of the original version of the input document and display of the translated version of at least a portion of the input document.

19. A computer program product comprising a non-transitory computer-readable medium having a computer-readable program code embodied therein to be executed by one or more processors, the program code including instructions to:
- extract text from an input document to generate at least one inference box based on the extracted text, the inference box including a transcription of the extracted text;
- input the inference box into a neural network foreign language translation (NN-FLT) model trained on one or more training labels associated with a separate machine translation engine, each training label providing a human-augmented version of each portion of machine translation output received from the separate machine translation engine;
- receive a first translation of the transcription generated by the NN-FLT model; and
- display the first translation in a user interface with respect to display of an original version of the input document and display of a translated version of at least a portion of the input document, wherein display the first translation in the user interface further comprises:
  - detect a selection of an icon representing the original document presented in the user interface; and based on the selection of the icon, triggering a user interface side-by-side view of a portion of the original version of the input document and the translated version of the portion of the input document, wherein the inference box is represented in both views of the portion of the original version of the input document and the translated version of the portion of the input document.

* * * * *